(12) United States Patent
Siegman

(10) Patent No.: US 6,751,388 B2
(45) Date of Patent: Jun. 15, 2004

(54) FIBER LASERS HAVING A COMPLEX-VALUED VC-PARAMETER FOR GAIN-GUIDING

(75) Inventor: Anthony E. Siegman, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 78 days.

(21) Appl. No.: 10/093,963

(22) Filed: Mar. 7, 2002

(65) Prior Publication Data

US 2003/0031442 A1 Feb. 13, 2003

Related U.S. Application Data

(63) Continuation-in-part of application No. 09/231,327, filed on Jan. 13, 1999, now abandoned.

(51) Int. Cl.[7] .............................. G02B 6/02; H01S 3/30
(52) U.S. Cl. ........................................ 385/124; 372/6
(58) Field of Search ................................ 385/123–128; 372/6

(56) References Cited

U.S. PATENT DOCUMENTS

| | | |
|---|---|---|
| 3,808,549 A | 4/1974 | Maurer |
| 4,815,079 A | 3/1989 | Snitzer et al. |
| 5,187,759 A | 2/1993 | DiGiovanni et al. |
| 5,712,941 A | 1/1998 | Imoto et al. |
| 5,818,630 A | 10/1998 | Fermann et al. |
| 6,275,512 B1 | 8/2001 | Fermann |

OTHER PUBLICATIONS

Poole et al., "Fabrication of Low–Loss Optical Fibers Containing Rare–Earth Ions", Optics Letters, vol. 22, 1985, pp. 737–738.

Poole et al., Fabrication and Characterization of Low–Loss Optical Fibers Containing Rare–Earth Ions, Journal of Lightwave Technology, vol. 4, pp. 870–876, 1986.

Primary Examiner—Frank G. Font
Assistant Examiner—Amanda Merlino
(74) Attorney, Agent, or Firm—Lumen Intellectual Property Services, Inc.

(57) ABSTRACT

The instant invention concerns optical fibers that have complex-valued $V_c$-parameters due to gain g established by active dopants that are doped into the fiber core in accordance with a doping profile. In particular, the doping levels are very high, such that the gain g makes a sufficiently large contribution to an imaginary part of the complex-valued $V_c$-parameter to define at least one gain-guided mode, e.g., the fundamental mode or several low-order modes of radiation in the optical fiber. The fiber does not require any index-guiding effects to a single mode or just a few of the lowest-order modes in large cross-section cores having diameters in the range from 50 μm to 500 μm in diameter and yield kilowatt level output power. The fiber may, in addition to gain-guiding, take advantage of a refractive index profile to provide for index-guiding or index-antiguiding effects in addition to gain-guiding.

20 Claims, 9 Drawing Sheets

FIBER LASERS HAVING A COMPLEX-VALUED VC-PARAMETER FOR GAIN-GUIDING

RELATED APPLICATIONS

This application is a continuation-in-part of U.S. patent application Ser. No. 09/231,327 filed on Jan. 13, 1999, now abandoned which is incorporated herein by reference.

FIELD OF THE INVENTION

This invention relates generally to coherent light sources. More particularly, it relates to high power optical fiber lasers with doping profiles selected to produce complex-valued $V_c$-parameters to support gain-guiding of radiation.

BACKGROUND OF THE INVENTION

Optical fiber lasers have a core doped with ions capable of providing laser amplification when pumped with optical energy. In conventional fiber lasers, the core has a higher index of refraction than the surrounding cladding. Fiber lasers have a number of inherent advantages compared to solid state and gas lasers. Fiber lasers are simple, rugged, and inexpensive devices with a minimum of complex-valued optical and mechanical components. Optical fiber materials are compatible with a very wide range of solid state laser ions operating at many different wavelengths. These laser ions can be distributed along a substantial length of fiber, up to many meters long, with the pumping light fully trapped within the fiber over the full distance. At the same time the unwanted optical losses for either pump or signal waves can be very small in modern fibers. For additional background information on fiber lasers the reader is referred to U.S. Pat. No. 3,808,549 to Maurer.

In many applications, both for telecommunications and for fiber laser devices, it is desirable to have a single mode fiber, i.e., a fiber that can propagate only one single lowest-order mode, with no higher-order modes being able to propagate or be trapped by the fiber. For general teaching on single-mode fiber lasers the reader is referred to Poole et al., "Fabrication of Low-Loss Optical Fibers Containing Rare-Earth Ions", Optics Letters, Vol. 22, 1985, pp. 737–738. Now, specifically, achieving single-mode behavior requires a combination of a small enough index step $\Delta n$ between the core and cladding regions of the fiber and a small enough diameter d for the core region of the fiber.

Since optical fibers have a relatively small diameter (e.g. <1 mm, which is small compared to solid state lasers), the optical power densities are large even for small total optical powers. This leads to both efficient pumping and efficient signal extraction in a wide variety of laser ions. All of the incident pumping radiation can be absorbed by the laser ions even on very weakly absorbing pump transitions, and the overall conversion of pumping light to laser output can be extremely efficient. Further, the small outer diameter of the optical fiber permits efficient heat extraction.

In recent years, high power fiber lasers have been manufactured with ever increasing optical powers. A major advance has been the development of 'cladding pumped' fiber lasers as disclosed in U.S. Pat. No. 4,815,079 to Snitzer et al. In cladding pumped fiber lasers, the laser light is confined to a small core (usually single mode) while the pump light propagates in a much larger cladding surrounding the core. The laser light in the core retains its desired single mode characteristic while the pump light is gradually absorbed by the lasing ions in the core. The large cladding permits high pump energies to be injected into the ends of the fiber, and permits this pump energy to be supplied by spatially incoherent pump sources such as spatially incoherent diode laser arrays. This increases the attainable power output of fiber lasers. Fiber lasers providing tens of watts of optical power output are now possible with cladding pumped designs. This has made possible new applications for fiber lasers including material processing and other high-power applications.

An important objective in the design of many optical fiber lasers is to obtain amplification of only a single transverse mode of the fiber core. This severely limits the size of the fiber core. The diameter of the core in conventional index-guided fibers must be limited to less than about 10 microns if the laser output is to have only a single transverse mode. Cores larger than this will propagate multiple higher-order transverse modes. This size limitation results in a ceiling on the achievable output power of the fiber laser due to a maximum power intensity that the core can carry. When the laser power intensity (watts/mm$^2$) in a single mode fiber exceeds a certain maximum value, stimulated Raman scattering occurs which converts the laser light to other wavelengths. The Raman scattering is inherent in the fiber material itself and places an absolute limit on the maximum power intensity the core can carry. The threshold for the onset of stimulated Raman scattering is a few tens of watts for single mode cores of typical size. Increasing the size of the core reduces the power intensity, thereby preventing Raman scattering, but invariably allows unwanted higher-order transverse modes to be produced.

In U.S. Pat. No. 5,818,630 Fermann et al. teach single-mode amplifiers based on multi-mode fibers. The problem of multi-mode propagation and mode conversion is partially avoided by using relatively short fiber lengths together with careful shaping or mode-matching of the injected light so as to launch only the preferred fundamental or lowest-order mode at the input end of the fiber, and with the entire length of the fiber maintained in a very straight line so as to minimize conversion of the light into higher-order modes as the light travels along the fiber. In addition, Fermann et al. teach confinement of the doping to the center of the fiber core in order to preferentially amplify the fundamental mode, to reduce amplified spontaneous emission and to allow gain-guiding of the fundamental mode, which is centered on the fiber axis. In addition, Fermann et al. propose that mode-filters be integrated into the laser cavity to promote a single near-diffraction limited mode. The fibers used by Fermann et al. have a V-parameter higher than 2.5 and a relatively high index of refraction difference between the fiber core and cladding.

The term gain-guiding as used by Fermann et al. defines a gain confinement or preferential amplification achieved by the doping profile. The fibers do not actually gain-guide any modes, rather, the modes are guided because of the refractive index profile. In other words, the doping profile does not support any guided modes.

In U.S. Pat. No. 5,712,941 to Imoto et al. teach the use of single-mode fiber with multiple cores and consolidated cores exhibiting various doping profiles. In this case the doping profiles also do not support any gain-guiding and a refractive index profile is used to define the guided modes.

In U.S. Pat. No. 5,187,759 DiGiovanni et al. teach a high gain multi-mode optical amplifier which attempts to prevent excitation of the numerous higher order modes. DiGiovanni et al. teach to carefully launch the radiation substantially along the center axis of the multi-mode fiber within a predetermined launch angle. Thus, rather than exciting all modes, only lower order modes are affected. They also teach that the doping profile can be adjusted to further reduce mode coupling.

Unfortunately, none of the above solutions can be used to produce a long and stable multi-mode fiber operating in just the fundamental mode and yielding high output power. In fact, due to optical aberrations, even well corrected optics used to carefully launch radiation into multi-mode fibers typically allow the excitation of the fundamental mode only with maximum efficiency of about 95%. Therefore, to date, it has been considered that mode-locking of a multi-mode fiber is impossible and no stable operation of a mode-locked multi-mode fiber laser has yet been demonstrated.

In U.S. Pat. No. 6,275,512 Fermann teaches a mode-locked multi-mode fiber laser pulse source and suggests that the above-mentioned problems be overcome by suitable cavity design. Specifically, Fermann teaches the use of a saturable absorber in the laser cavity to achieve mode locking in multi-mode fibers. His objective is to achieve stable generation of high peak power pulses from mode-locked multi-mode fibers. Unfortunately, such mode locking cannot be easily employed and can lead to damage of the absorber when high peak powers are reached.

Therefore, the problem of producing a fiber laser which has a large core diameter but guides only the lowest order mode, or a select number of lower order modes and produces high output power remains. Specifically, it would be an advance in the art to provide a fiber laser with a large core cross-section that is relatively long, produces output power in the kilowatt range and only guides the fundamental mode or a select number of lower order modes.

OBJECTS AND ADVANTAGES OF THE INVENTION

Accordingly, it is a primary object of the present invention to provide an optical fiber that can be used in a fiber laser to produce output in a single mode or a minimal number of low-order modes. It is a further object of the invention to ensure that the optical fiber laser is easy to use and provides kilowatt level power. These and other objects and advantages will be apparent upon reading the following description and accompanying drawings.

SUMMARY OF THE INVENTION

These objects and advantages are attained by an optical fiber with a complex-valued $V_c$-parameter. The optical fiber has a core, a cladding surrounding the core and an active dopant distributed in the optical fiber in accordance with a doping profile. The doping profile establishes a gain g that makes a sufficiently large contribution to an imaginary part of the complex-valued $V_c$-parameter to define at least one gain-guided mode, e.g., the fundamental mode or several low-order modes of a radiation in the optical fiber. In other words, the imaginary part of the $V_c$-parameter defines the gain-guiding properties of the optical fiber.

The core and the cladding can also be designed to exhibit a refractive index profile. The refractive index profile and the gain profile then jointly contribute to the complex-valued $V_c$ parameter of the fiber, and together determine the modes and mode propagation properties of the fiber.

As will be demonstrated in the following, in fibers with complex-valued $V_c$-parameters it is generally more convenient to characterize these fibers not by the complex value of the $V_c$ parameter itself, but by the square of this value, that is, by the value of the square of the complex-valued $V_c$-parameter. In this convention gain g in the fiber contributes to the imaginary part of the square of the complex-valued $V_c$-parameter, while the refractive index profile (if present) contributes to the real part of the square of the complex-valued $V_c$-parameter. It is important to note that in accordance with the present invention it is not necessary that the fiber have an index profile accompanying the gain g for the fiber to guide gain-guided modes. A purely gain-guided fiber with no index profile will have a purely imaginary value of the square of the complex-valued $V_c$-parameter, with the real part of the square of the complex-valued $V_c$-parameter being zero.

In one embodiment the real part contributed to the square of the complex-valued $V_c$-parameter due to the index profile is positive. The actual index profile can be of any suitable shape including graded-index profiles, W-, M- and other more complex-valued profiles. In one embodiment the index profile is a step-profile, e.g., with the core having a higher index n, and the cladding having a lower index $n_o$. In this case the optical fiber exhibits index-guiding of the radiation in addition to gain-guiding. In another embodiment, the index profile can be such that the real part is negative. In this case the index-profile can also be of any suitable shape including graded index profiles, W-, M- and other more complex-valued profiles. In one embodiment, the index profile is a step-profile, e.g., with the core having a lower index and the cladding having a higher index. When the real part of the square of the complex-valued $V_c$-parameter is negative the optical fiber exhibits index-antiguiding in addition to gain-guiding.

The optical fiber of the invention can be a single-mode fiber or a multi-mode fiber. It is important to bear in mind, that the gain-guiding contribution to the complex-valued $V_c$-parameter will allow the designer to obtain a fiber with a larger core diameter which will still support a single mode or a few low-order modes of radiation. It is particularly useful to build fibers with core diameters in the range of 50–500 microns.

The optical fiber has a fiber axis passing through its core. Depending on the modes that are gain-guided, the doping profile can have a maximum on the fiber axis. For example, the doping profile can have a maximum on the fiber axis and decrease monotonically with increasing fiber radius. For example, the doping profile can be parabolic and centered on the fiber axis. In yet another embodiment, the doping profile can have a step-profile with one or more steps. A person skilled in the art will recognize that many other doping profiles are possible. The active dopant preferably includes active ions such as Nd, Yb, Er or other suitable lasant materials.

The optical fiber of the invention is preferably used as a fiber laser or as a laser amplifier. When used in these capacities it is convenient to pump the optical fiber through its cladding. A pump source coupled to the cladding provides the requisite pump radiation that passes into the core to stimulate the active dopant, i.e., the ions of Nd, Yb, Er or others.

The invention also provides a method for designing an optical fiber with a complex-valued $V_C$-parameter. In accordance with the method the core and cladding surrounding the core are defined. The optical fiber is doped with the active dopant such as active ions of Nd, Yb, Er or others to produce a certain doping profile. The doping profile establishes a gain g inside the optical fiber that makes a sufficiently large contribution to the imaginary part of the complex-valued $V_C$-parameter to define at least one gain-guided mode of radiation within the fiber. The method of the invention can be extended to further defining an index profile that establishes index-guiding or index-antiguiding. It is also possible to use no index effects at all. When working with step profiles, i.e., when the index exhibits a step index profile and the dopant exhibits a step dopant profile it is convenient to approximate the complex-valued said complex-valued $V^C$-parameter as:

$$V_c \approx \left(\frac{2\pi a}{\lambda}\right)\sqrt{2n_1\left[\Delta n + j\frac{\lambda}{2\pi}g\right]},$$

where a is the core radius, Δn is the index difference between the core and cladding, and λ is the free space wavelength of the radiation. As noted above, it is convenient to consider instead the square of the complex-valued $V_C$-parameter:

$$V_c^2 = \left(\frac{2\pi a}{\lambda}\right)^2 2n_1\left[\Delta n + j\frac{\lambda g}{2\pi}\right],$$

since it is then apparent that the index difference Δn is entirely responsible for the real part of the square of the complex-valued $V_C$-parameter, while the gain profile g is entirely associated with the imaginary part of the square of the $V_C$-parameter. Further details of the invention are explained in the below detailed description with reference to the attached drawing figures.

THEORETICAL OVERVIEW OF THE PRIOR ART

Figure 1:
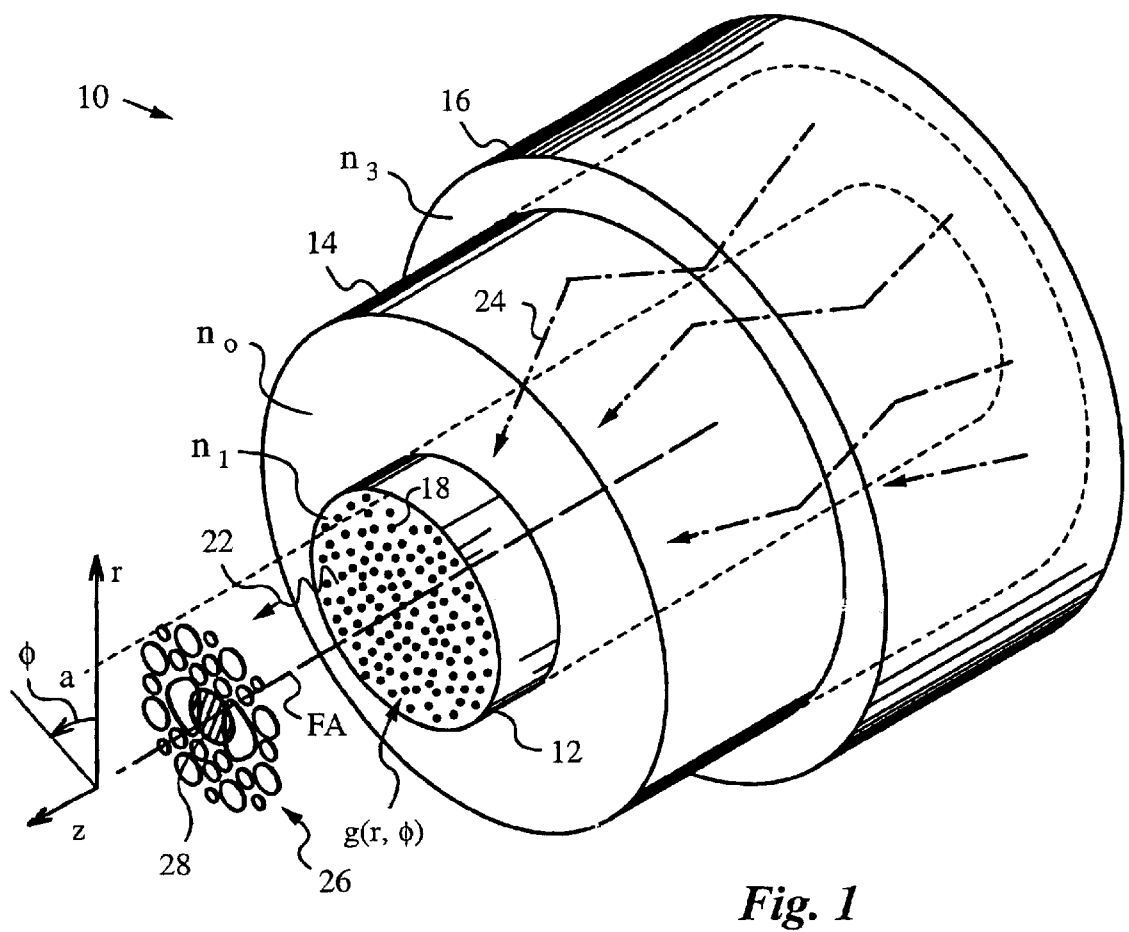
FIG. 1 shows an isometric view of an optical fiber designed in accordance with the invention.

Present-day optical fibers use the index of refraction to trap and guide radiation in a higher index region, e.g., the fiber core, surrounded by a lower index region, e.g., the cladding. Such fibers are commonly referred to as "index-guided" and the difference Δn between the index $n_1$ of the transparent material in the core and slightly lower index $n_o$ in the cladding are frequently very small. The exact spatial distribution of the refractive index n across the transverse cross section of an optical fiber can take many different forms including step-index profiles and graded-index profiles. Examples of step-index and graded-index profiles are shown in U.S. Pat. No. 5,712,941 to Imoto et al. in FIG. 6. Many other more complicated variations of the refractive index with transverse position such as M- and W-profiles are also used in fibers to create index-guided optical fibers. In fact, FIG. 7B of Imoto et al. illustrates a W-profile fiber. Still more complex-valued index profiles are sometimes used to control the detailed propagation characteristics of optical fibers.

Whatever may be the detailed index profile, a single basic principle governs index guiding in all types of optical fibers. Successful trapping or waveguiding of radiation in any index-guided fiber will occur only if the average index of refraction within the central or core region of the fiber has a numerical value higher than the index of refraction in the outer or cladding region of the fiber. This is the primary requirement for optical waveguiding in all types of index-guided optical fibers.

In an elementary index step fiber, i.e., where the index profile has a step-profile, the outer or cladding region typically has a constant refractive index value $n_o$, while the central or core region of the fiber has a constant index value $n_1 = n_o + \Delta n$. Typical values for the core and cladding indices in glass fibers are on the order of 1.4 to 1.5, while the difference in refractive index Δn between these two regions will typically be on the order of 1% or smaller. For example, a range of Δn≈0.01 to 0.001 is common in standard or conventional optical fibers. This difference in index is achieved in practice by making small changes in chemical composition between the different regions of the fiber, for example by adding small amounts of "doping" atoms such as Germanium, Aluminum or other atoms to the glass mixture in either the core or cladding regions.

Optical fibers transmit radiation in the form of one or more transverse modes. Each such transverse mode is a specific transverse pattern or transverse intensity profile for the radiation traveling within the fiber. Each mode will maintain its characteristic transverse pattern unchanged with distance as the radiation travels along the fiber, assuming that the fiber is ideal and has no bends, kinks, or defects.

The so-called "lowest-order mode" or fundamental mode in a given fiber will typically have the appearance of a single smooth spot of light centered within the core of the fiber, as seen looking at the output end of the fiber. A fiber that can propagate only one such lowest-order mode is known as a single-mode fiber. A multi-mode fiber, by contrast, will also have some number of higher-order modes whose intensity profiles will typically have the appearance of multiple smaller spots arranged in a regular array.

Each transverse mode propagates independently along the fiber without changing shape, and the total radiation propagating in the fiber consists of a superposition of these individually trapped and propagating modes. Bends, kinks, or any small random internal defects or irregularities in a multimode fiber will, however, scatter energy from any one transverse mode into various other transverse modes of that fiber. As a result, no matter what single mode or combination of modes may be launched into the input end of a multimode fiber, as a practical matter once the radiation has propagated for any significant distance along a multimode fiber the transverse mixture will become highly mixed or randomized, with the radiation distributed over most of the propagating modes supported by that fiber. This is one of the major problems that need to be solved to provide single mode propagation in a multimode fiber.

To solve this problem the above-mentioned prior art teachings suggest preferential amplification of the desired mode, e.g., the fundamental mode, by centering the doping profile on the center of the core. To accomplish this the optical fiber has an index profile that determines the guided-modes and a gain profile which controls the preferential amplification. Thus, the gain profile taught by the prior art is merely sufficient to perform "gain shaping" in index-guided fibers but not to determine the guided-modes.

DETAILED DESCRIPTION OF THE INVENTION

The solution in accordance with the invention will be best understood by initially referring to FIG. 1, which illustrates an optical fiber 10 made of a glass material or another suitable material known in the art. Fiber 10 has a core 12 with an index of refraction $n_1$, surrounded by a cladding 14 with an index of refraction $n_o$. In turn, cladding 14 is enclosed by an outer cladding 16 with an index of refraction $n_c$. In contrast with the prior art, the indices of refraction $n_1$, $n_o$, of core 12 and cladding 14 are equal. In other words, the index difference $\Delta n$ between core 12 and both cladding layers 14, is zero. Thus, fiber 10 is not an index-guided fiber.

Index of refraction $n_c$ of outer cladding 16 is typically lower than index $n_o$, in order to aid in cladding pumping. However, outer cladding 16 is sufficiently far from core 12 and cladding 14 that it has no significant effect on the processes of gain-guiding which will be described below, as will be appreciated by any person skilled in the art.

A fiber axis FA of fiber 10 is disposed along a z-axis of a cylindrical coordinate system, which is a convenient coordinate system for describing fiber 10. In the cylindrical coordinate system the transverse section or cross-section of fiber 10 is described in terms of radius r and azimuthal angle $\phi$. In this coordinate system the radius of core 12 is equal to a (r=a).

Figure 2:
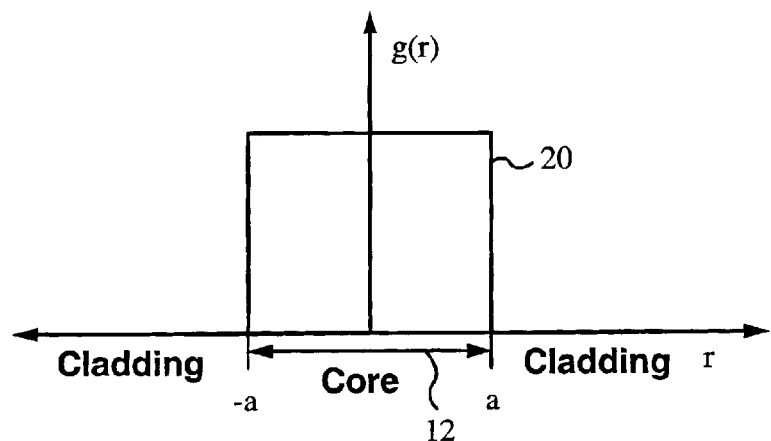
FIG. 2 is a graph illustrating a doping profile in the fiber of FIG. 1.

Core 12 is doped with an active dopant 18 distributed in accordance with a rotationally symmetric doping profile 20 (i.e., dependent on radius r and not on angle $\phi$), as illustrated in FIG. 2A. In the present embodiment, doping profile is a step-profile. Dopant 18 is an active material, and is preferably constituted by active ions from the rare-earth group of elements such as Nd, Yb, Er or other suitable lasant materials that can be stimulated to emit a radiation 22 at the desired wavelength $\lambda$. In fact, a person skilled in the art will appreciate that different atoms provide amplification in different wavelength bands and will select the appropriate material based on desired wavelength $\lambda$. It should be noted that for the purposes of this description, wavelength $\lambda$ is the free space wavelength.

Doping profile 20 is obtained by doping the glass material of core 12 in accordance with any known doping technique. It is noted that in fiber 10 of FIG. 1 a portion of cladding 14 is also doped. Profile 20 defines a gain g that is highest where the concentration of dopant 18 is highest and drops off with decreasing amount of dopant 18. In this case, gain g is rotationally symmetric, g=g (r), equal throughout core 12, and it does not depend on angle $\phi$, just like doping profile 20. Of course, a person skilled in the art will recognize that, in general, doping profile 20 can be a function of radius r and angle $\phi$ (e.g., doping profile 20 can be elliptical or irregular) such that gain g=g (r,$\phi$).

Cladding 14 is designed to accept and transmit pump radiation 24 at a pump wavelength $\lambda_p$ for pumping dopant 18 to stimulate emission of radiation 22 at wavelength $\lambda$. Pump radiation 24 may be delivered from any suitable pump source, such as a semiconductor diode laser (not shown) and coupled into cladding 14 or directly into core 12. Of course, pump radiation 24 can also be delivered to core 12 in accordance with any other suitable method.

When pumped by pump radiation 24, dopant 18 emits radiation 22 that can propagate in any one of a number of modes supported by fiber 10 in accordance with the rules discussed below. The approximate transverse intensity distributions of several lower-order modes are illustrated in a simplified manner and designated by reference 26. A lowest-order or fundamental mode 28 is hatched and corresponds to radiation 22 propagating in a gaussian intensity distribution centered on fiber axis FA.

Now, in prior art fibers the refractive index profile alone determines the guided modes. Specifically, when the core has an index $n_1$ that is larger than the index $n_o$ of the cladding by an index difference $\Delta n = n_1 - n_o$ and the index profile is a step-profile the guided modes are determined by the well-known V-parameter. This parameter is a real number defined by the following equation:

$$V^2 \equiv \left(\frac{2\pi a}{\lambda}\right)^2 (n_1^2 - n_o^2),$$

where a is the core radius and $\lambda$ is the free space wavelength of the radiation. Since $\Delta n$ is very small, usually on the order of 1% or less, the above formula can be simplified to yield:

$$V \approx \frac{2\pi a}{\lambda} \sqrt{2 n_1 \Delta n}.$$

Since $\Delta n$ is small, $n_1$ in the preceding equation could equivalently be replaced by $n_o$ or the average of $n_1$ and $n_o$.

The analytic results for such index guided fiber further indicate that the core will trap no modes for $V \leq 0$, a single mode for $0 < V \leq 2.405$ and multiple modes for $V > 2.405$. The number of modes that can propagate in the core when $V >> 2.405$ is determined by ($\frac{1}{2}$) $V^2$. It is also apparent that making an index-guided single-mode fiber by increasing the core radius a to a large value, e.g., a=50 microns, will require that $\Delta n$ be reduced to as little as $3 \times 10^{-5}$. As a practical matter, however, it is very difficult to control the index of refraction in the core and cladding regions to this degree of accuracy or to produce an accurately controlled index step this small. Large-diameter single-mode index-guided fibers are therefore not generally considered to be practical devices.

In contrast, there is no index difference $\Delta n = 0$ between core 12 and cladding 14 in the present embodiment of the invention. Hence, no index-guided modes are determined in fiber 10 because the real-valued V-parameter is zero. Instead, core 12 has a gain g that makes a sufficiently large contribution to an imaginary part of a complex-valued $V_c$-parameter rather then the real V-parameter to define at least one gain-guided mode. The complex-valued $V_c$-parameter has a complex-valued valued index difference $\Delta n_c$ defined as:

$$\Delta n_c \equiv \Delta n + j\frac{\lambda}{2\pi}g,$$

where $j=\sqrt{-1}$ and the imaginary part thus being $\lambda g/2\pi$. The complex-valued $V_c$-parameter itself can be expressed as:

$$V_c \approx \left(\frac{2\pi a}{\lambda}\right)\sqrt{2n_1\left[\Delta n + j\frac{\lambda}{2\pi}g\right]}.$$

As noted earlier the discussion will be more clear when one considers the square of the complex-valued $V_c$-parameter, or $V_c^2$ as given by:

$$V_c^2 = \left(\frac{2\pi a}{\lambda}\right)^2 2n_1\left[\Delta n + j\frac{\lambda g}{2\pi}\right].$$

From either of these two expressions it is clear that the distinction between index-guided and gain-guided fibers depends on the magnitudes of the real and imaginary parts, $\Delta n$ and $\lambda g/2\pi$. Specifically, for index-guiding to be dominant and determine the guide d modes the real part of the complex-valued valued index difference $\Delta n_c$ has to be much larger than the imaginary part, in other words:

$$\Delta n >> \frac{\lambda}{2\pi}g.$$

On the other hand, for gain-guiding to be dominant and determine the guided modes, the imaginary part of the complex-valued valued index difference $\Delta n_c$ has to be sufficiently large, i.e., much larger than the real part, or:

$$\frac{\lambda}{2\pi}g >> \Delta n.$$

Unless the last relationship is kept, the effects of gain will be too weak to produce even small changes in the mode shapes. It is worth noting that prior art fiber lasers typically have an index difference $\Delta n \geq 10^{-3}$ and a gain $g \leq 0.1$ cm$^{-1}$. Thus, in the a conventional fiber laser the imaginary part of the complex-valued $V_c$-parameter is on the order of $10^{-6}$ or even $10^{-7}$ while the real part is on the order of $10^{-3}$. For example, the multi-mode amplifier taught by Fermann et al. in U.S. Pat. No. 5,818,630 operates with radiation at wavelength $\lambda=1.56$ $\mu$m, power input of 14 mW, fiber length of 110 cm to obtain a power output of 100 mW. This corresponds to a gain $g=10^{-2}$ cm$^{-1}$ and thus the imaginary part in the complex-valued $V_c$-parameter is only $2.5\times10^{-7}$. In such prior art fibers the imaginary part is not sufficiently large and index-guiding is dominant while gain-guiding is negligible.

In accordance with the invention, $\Delta n$ is zero and gain g is on the order of 0.1 to 1.0 cm$^{-1}$. Hence, the condition that the imaginary part be significantly larger than the real part of complex-valued $V_c$-parameter is satisfied. With this range of gain g, the diameter D of core 12 (or twice the radius, D=2a) is selected between 100 to 200 $\mu$m and thus only the fundamental mode 28 is guided. To obtain the desired high output power in mode 28, the intensity of radiation 22 per unit cross-sectional area of core 12 is kept low. This prevents the onset of Raman and Brillouin effects. However, because the total cross-sectional area of mode 28 is on the order of the cross-sectional area of core 12, i.e., $2\pi a^2$, the total output power is on the order of kilowatts. Optical fiber 10 can thus be used as a fiber laser or amplifier to produce kilowatt level single-mode output. Alternatively, by reducing gain g or increasing diameter D to up to 500 $\mu$m, the output is delivered in a number of lower-order modes.

A person skilled in the art will appreciate that the choice of values for a, $\lambda$ and g (r,$\phi$) (or doping profile 20) will determine the gain-guided modes in accordance with the complex-valued $V_c$-parameter. As long as the contribution of the gain g to the imaginary part of $V_c$ is significant, in other words, as long as $$\frac{\lambda}{2\pi}g >> \Delta n,$$

the guided modes are predominantly gain-guided. This means that it is possible to design core 12 and cladding 14 to exhibit a refractive index profile as long as $\Delta n$ is very small in comparison to $\lambda g/2\pi$, e.g., when gain g is on the order of 1.0 cm$^{-1}$ then $\Delta n$ should not be larger than $10^{-5}$.

Continuing in the above convention and expressing gain coefficients in units of inverse centimeters (cm$^{-1}$), total amplification for an optical wave of radiation 22 propagating for a distance L in core 12 with gain g is given by:

$$\left|\frac{u_{out}}{u_{in}}\right| = \exp[gL],$$

for optical wave amplitude u, or by:

$$\frac{P_{out}}{P_{in}} = \left|\frac{u_{out}}{u_{in}}\right|^2 = \exp[2gL],$$

for the power P in the optical wave. An amplitude gain coefficient with a value $g=0.5$ cm$^{-1}$, corresponding to a power gain coefficient of 2 $g=1$ cm$^{-1}$, is considered an extremely large gain coefficient for a conventional optical fiber laser. Achieving this value of gain g requires doping core 12 of fiber 10 with an unusually large density of dopant 18, and pumping dopant 18 with a high level of pumping power or pump radiation 24.

Figure 3:
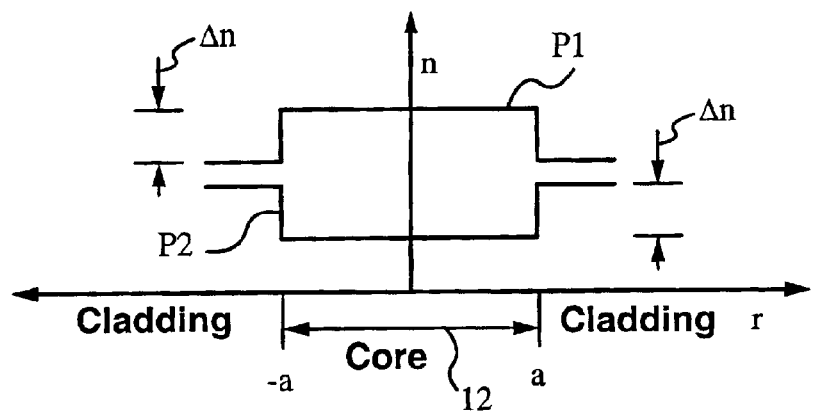
FIG. 3 is a graph illustrating step-profile index variations in the fiber of FIG. 1.

For the below discussion, when an index profile is used a step-profile index is chosen, as shown in FIG. 3. In particular, the index profile P1 has a positive value and provides for index-guiding, while profile P2 has a negative value and provides for index-antiguiding.

Figure 4:
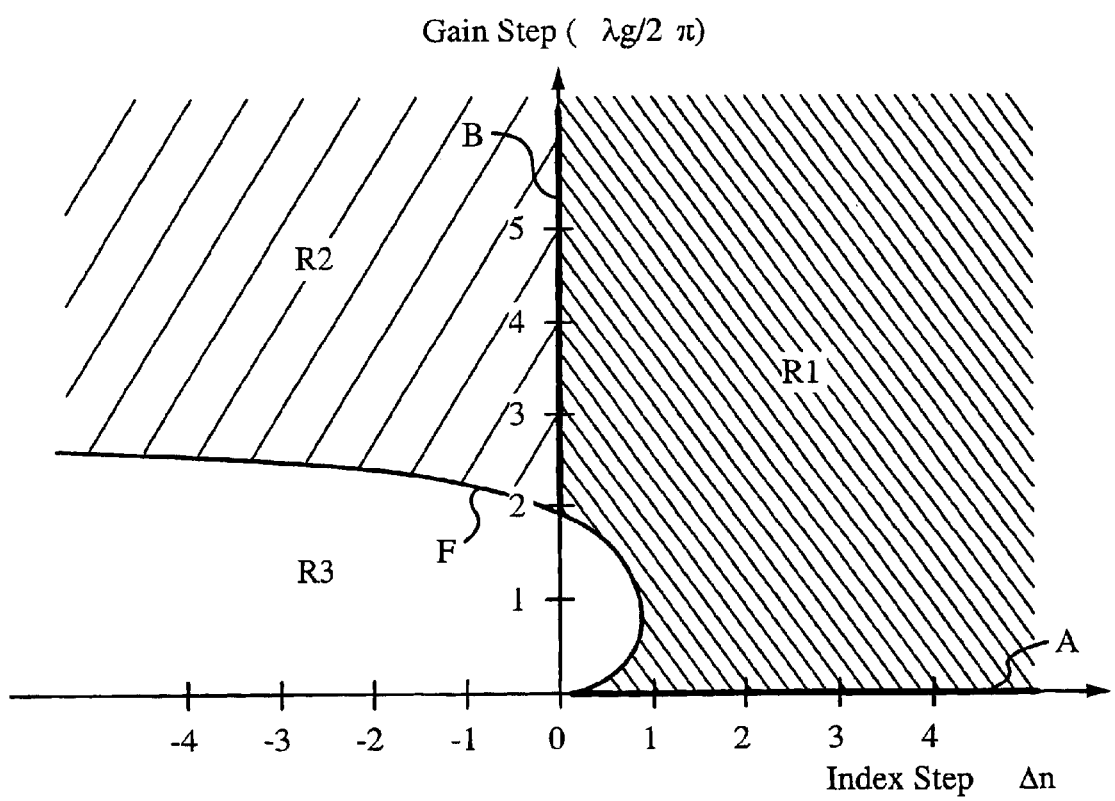
FIG. 4 is a graph illustrating the real and complex-valued contributions to the square of the complex-valued $V_c$-parameter of the fiber of FIG. 1.

FIG. 4 illustrates a graph of the real and imaginary contributions to the square of the complex-valued $V_c$-parameter. The real part or index step, $\Delta n$, responsible for index-guiding is graphed on the x-axis. The imaginary part or gain step, $\lambda g/2\pi$, is graphed on the y-axis. Conventional, purely index-guided fibers with no gain have $\Delta n>0$ and $g=0$ ($\lambda g/2\pi=0$) and are described by values of $\Delta n$ along a segment A on the x-axis, corresponding to purely real values of $V_c$ or $V_c^2$. Purely gain-guided fibers, such as fiber 10 of the present invention, have $\Delta n=0$ and $g>0$ and are described by values of $\lambda g/2\pi$ lying on a segment B on the y-axis.

Segments A and B and a curve F bound a region R1 of mixed index-guiding and gain guiding. In accordance with the invention, values of $\Delta n$ and $\lambda g/2\pi$ in region R1 can be selected as long as gain g is large enough such that $\lambda g/2\pi$ is significantly larger than $\Delta n$ so that the guided modes are predominantly gain-guided. Region R2 is bounded by segment B and curve F. Region R2 indicates mixed gain guiding and index anti-guiding, which occurs when $\Delta n<0$ or when index $n_o$ of core 12 is lower than index $n_1$ of cladding 14. In accordance with the invention, values of $\Delta n$ and $\lambda g/2\pi$ in region R2 can be selected. Finally, curve F defines a region R3 where no modes of radiation can propagate. In this region the gain-guiding is not strong enough to define guided modes or overcome index anti-guiding.

Figure 5:
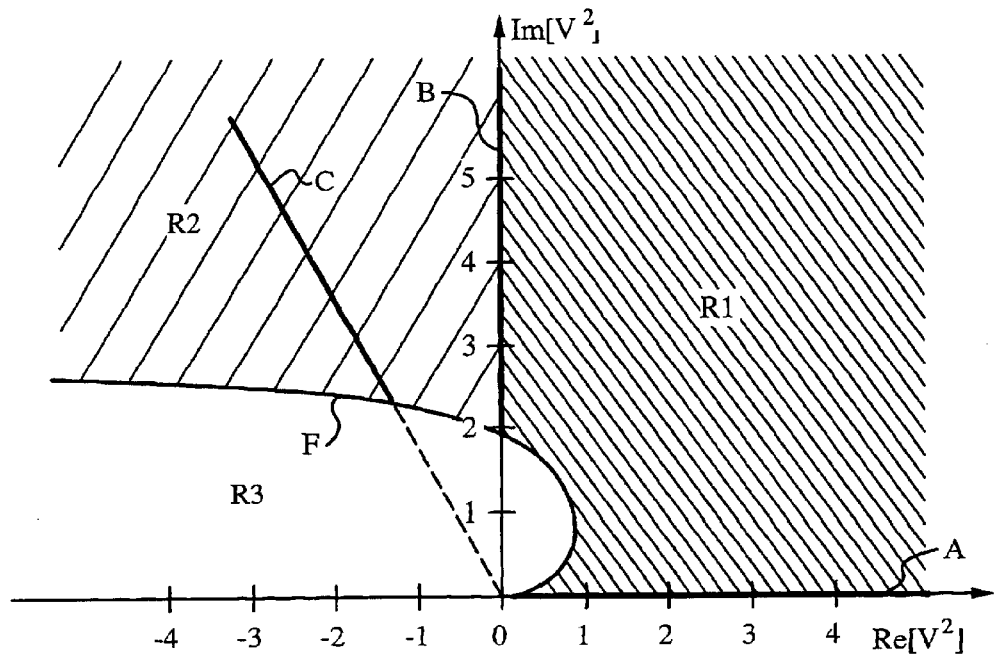
FIG. 5 is a graph illustrating the real and imaginary parts of $V_c^2$ of the fiber of FIG. 1

The real and imaginary parts of the square of $V_c$ are illustrated in the graph of FIG. 5. Specifically, the x-axis shows the real part:

$$\mathrm{Re}[V_c^2] = \left(\frac{2\pi a}{\lambda}\right)^2 2n_1 \Delta n,$$

while the y-axis shows the imaginary part:

$$\mathrm{Im}[V_c^2] = \left(\frac{2\pi a}{\lambda}\right)^2 2n_1 \frac{\lambda g}{2\pi}.$$

As in the graph of FIG. 4, segment A along the positive real axis corresponds to pure index-guided modes ($\Delta n>0$, $g=0$), segment B along the positive imaginary axis corresponds to pure gain-guided modes where $\Delta n=0$, $g>0$, $\mathrm{Im}[V_c^2]>1.9$). Region R1 defines a region in which the real part contributed to the square of complex-valued $V_c$-parameter due to the index profile is positive and gain g is positive as well. In other words, region R1 designates mixed index- and gain-guiding. Region R2 designates mixed gain-guiding and index-antiguiding with gain-guiding strong enough to overcome the index-antiguiding. In this region the real part contributed to the square of the complex-valued $V_c$-parameter by the index profile is negative while gain g is positive. No modes exist in region R3, where the positive gain-guiding is not strong enough to overcome the index-antiguiding due to negative $\Delta n$. A segment C indicates one particular set of choices of $\Delta n$ values corresponding to index-antiguiding and gain g values corresponding to gain-guiding. The solid part of segment C indicates values at which gain-guiding overcomes index-antiguiding. In accordance with the invention, fibers with values along the solid portion of segment C can be used to deliver high output powers, as they permit large values of radius a for core 12.

A person skilled in the art will recognize that by designing optical fibers in accordance with the above guidelines gain-guiding contribution to the complex-valued $V_c$-parameter can be used to design a fiber with a larger core diameter that will support a single mode of radiation. Specifically, fibers according to the invention can support single mode, kilowatt level power output with fiber core diameters ranging between 50 and 500 µm. In practice, it is important to bear in mind that gain-guiding is a weak effect and has poor tolerance to bending. Therefore, fiber 10 should be kept straight. To further improve performance, fiber 10 should be kept short, e.g., on the order of 10 cm. Additionally, the presence of dopant 18 will affect index $n_1$ of core 12 (and of cladding 14 if dopant 18 is present in it). To equalize this effect on index $n_1$ compensating atoms can be doped into core 12 in accordance with well-known principles.

Figure 6:
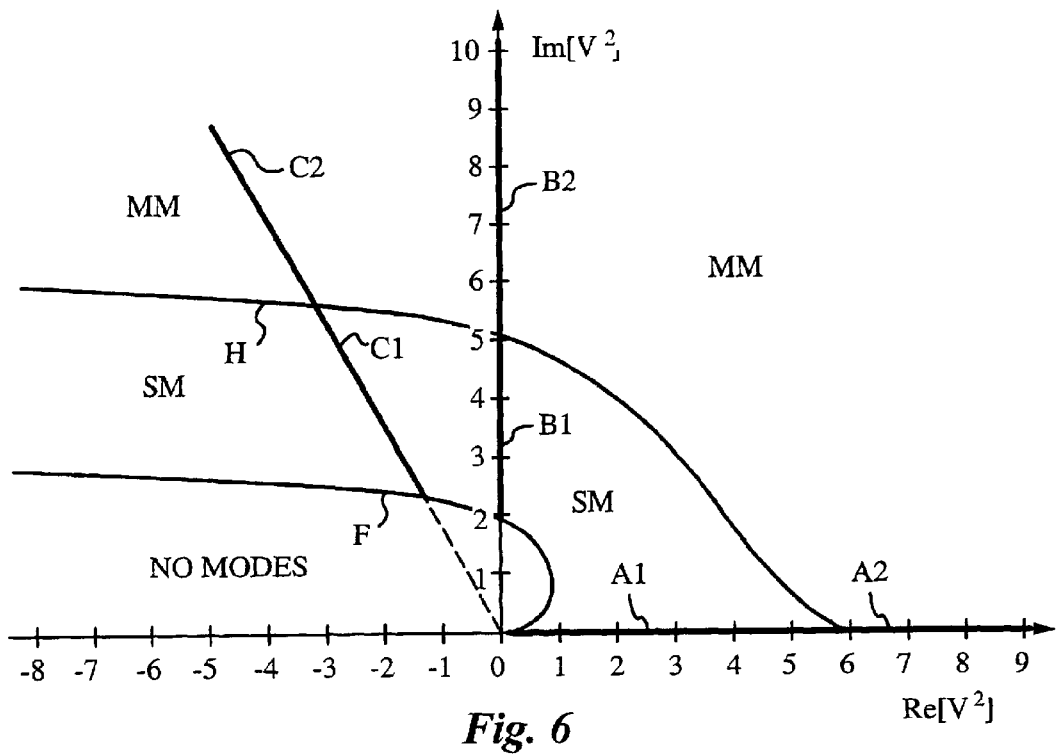
FIG. 6 is a graph showing regions in the $V_c^2$ plane in which the fiber of FIG. 1 provides for single mode and multi-mode propagation.

In accordance with the invention, fiber 10 can be specifically designed to support the propagation of a single mode or of a number of low-order modes. FIG. 6 illustrates the additional boundaries between single mode and multi-mode regions in the complex-valued $V_c^2$ plane of FIG. 5. Specifically, a curve H defines the boundary between single mode (SM) and multi-mode (MM) propagation. The region between curves F and H includes single mode solutions for gain-guiding with positive and negative index guiding as well as pure gain-guiding. No modes propagate in the fiber in the region under curve F.

Segment A1 indicates the values of the real part of $V_c^2$ for which a purely index-guided fiber will be single mode. This is true for $0 \leq 2.405$ or $0 \leq \mathrm{Re}[V_c^2] \leq 5.78$. Segment B1 indicates the values of the imaginary part of $V_c^2$ for which a purely gain-guided fiber is single mode. Segment A2, beginning after segment A1, indicates the value of the real part of $V_c^2$ for which a pure index-guided fiber will be multi-mode. Again, this is true for $V>2.405$ or $\mathrm{Re}[V_c^2]>5.78$. Meanwhile, segment B2 indicates where the purely gain-guided fiber is multi-mode. Similarly, for fibers which use values of gain-guiding and index-antiguiding prescribed by segment C, single mode operation will be ensured by choosing values in segment C1 between curves F and H, and multi-mode operation will be ensured by choosing values in segment C2.

A person skilled in the art will appreciate that the above teaching can be extended to design a high power fiber laser, amplifier or oscillator operating in continuous wave (cw) or pulsed manner. The actual values of the real and imaginary parts for each specific fiber will differ from the above values that are prepared for step-profile changes in gain g and index difference $\Delta n$. However, this teaching can be extended to fibers in which doping profiles are not step-profiles and the indices of refraction do not follow a step-profile.

Figure 7A:
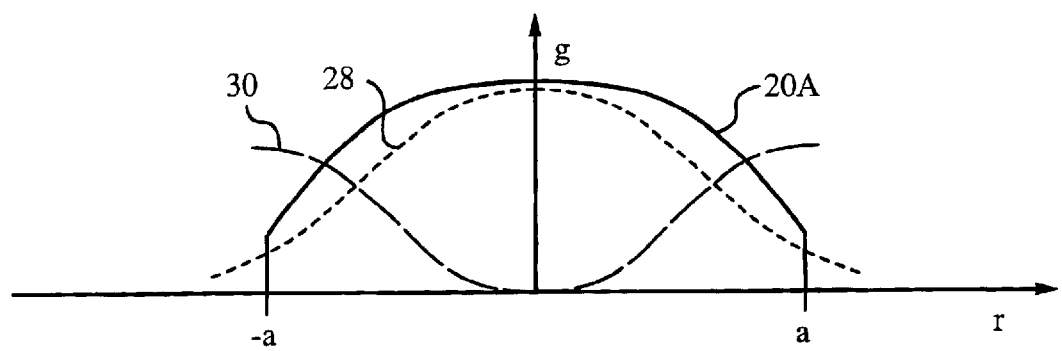
FIGS. 7A–D are graphs illustrating various dopant profiles in accordance with the invention.
Figure 7B:
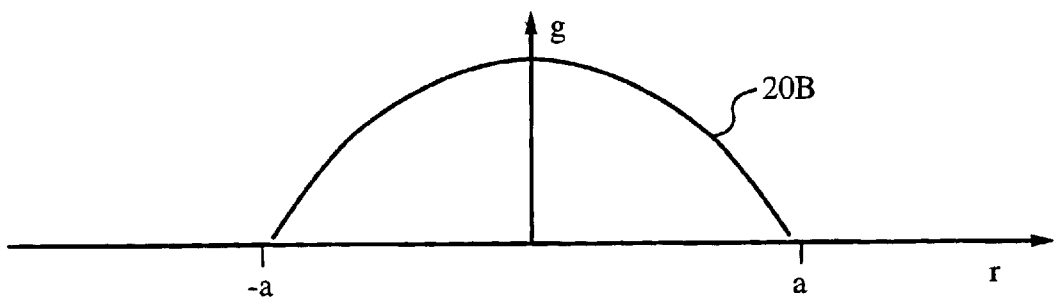
Figure 7C:
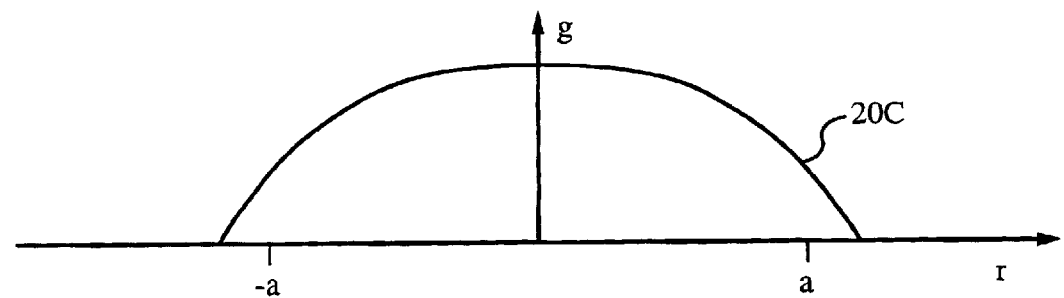
Figure 7D:
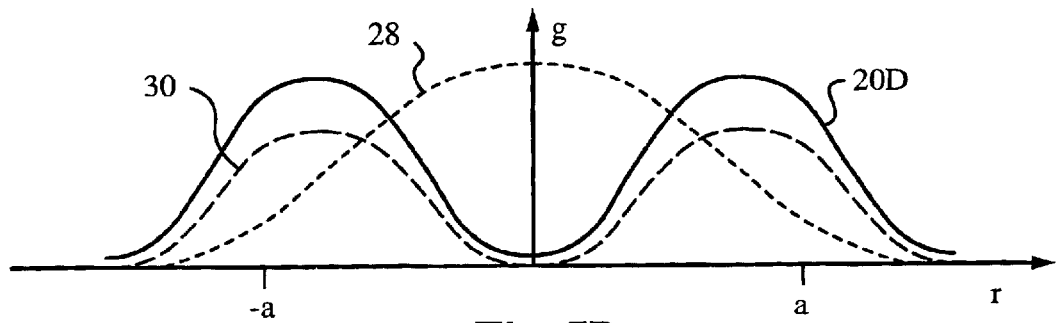

In fact, the actual gain profile and index profile, if index guiding or index-antiguiding is used in conjunction with gain-guiding, can be of any shape. For example, graded profiles are suitable for use with the present invention. FIGS. 7A–D illustrate four alternative doping profiles 20A–D which can be used in optical fibers according to the invention, such as fiber 10. First three doping profiles 20A–C in FIGS. 7A–C all have a maximum on fiber axis FA and decrease monotonically with increasing radius r. Doping profile 20A in FIG. 7A is parabolic and centered on fiber axis FA. For better understanding, fundamental mode 28 and a second-order mode 30 are indicated on top of profile 20A. Here, fundamental mode 28 overlaps profile 20A. Second-order mode 30, on the other hand, shows little overlap with profile 20A; this mode will not be gain-guided. Profile 20A has a step-decrease to zero at the boundary with the cladding layer, i.e., at r=a. In FIG. 7B doping profile 20B is also parabolic but it decreases to zero continuously at r=a without a step. Profile 20C of FIG. 7C is also parabolic and extends into the cladding. Profile 20D has two maxima, one to either side of the fiber axis. Profile 20D is in fact more coincident with second-order mode 30, rather than fundamental mode 28. Shaping gain profile 20D in such way can be used, just like the shaping of index-profiles in index-guided fibers, to help define the gain-guided modes, e.g., mode 30 in this case. It should also be noted that profiles 20A–D are rotationally symmetric. This does not need to be the case. For example, elliptical gain profiles may be used to help select preferred polarizations.

Figure 8A:
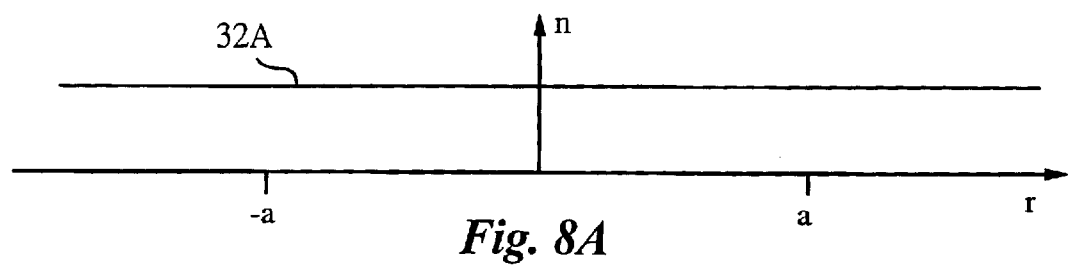
FIGS. 8A–E are graphs of various index profiles which can be used in conjunction with the dopant profiles.
Figure 8B:
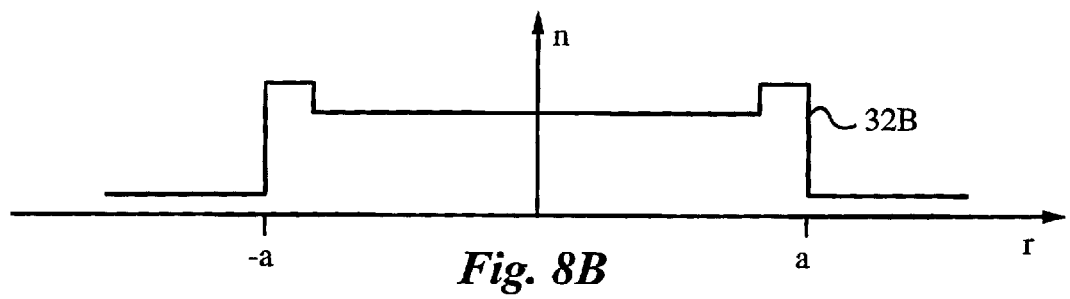
Figure 8C:
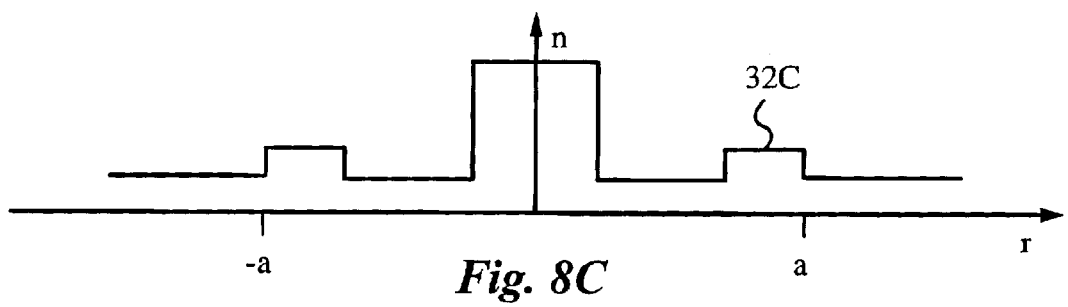
Figure 8D:
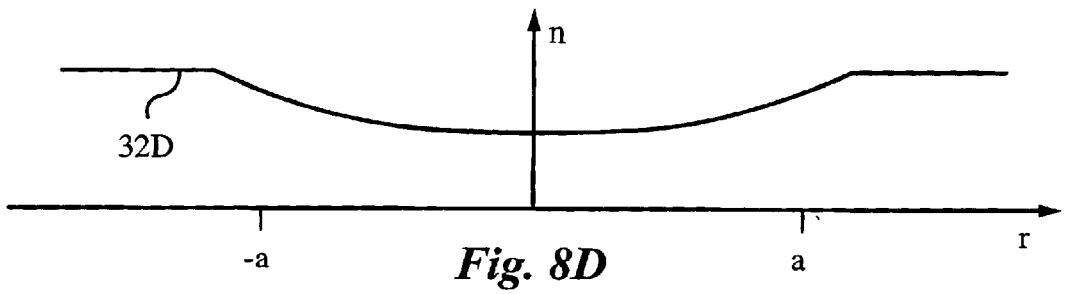
Figure 8E:
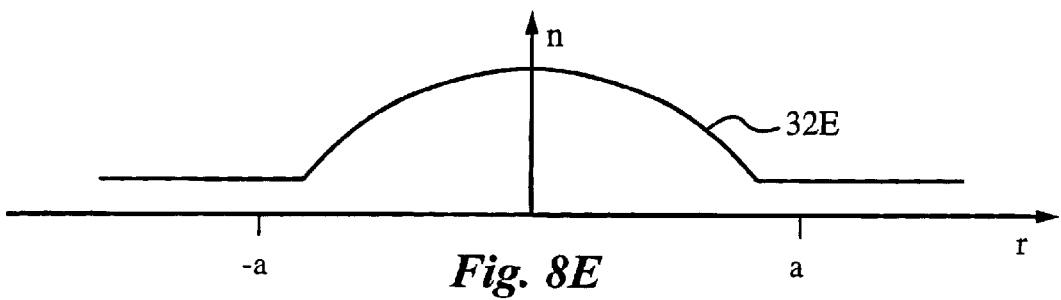

Gain profiles according to the invention can be used in fibers without index profiles, i.e., in pure gain-guiding cases and in fibers with index profiles other than step profiles P1, P2 discussed above. FIGS. 8A–E illustrate five exemplary index profiles 32A–E which can be used in fiber 10. Profile 32A of FIG. 8A is a uniform profile extending from core 12 to cladding 14; in this case $\Delta n=0$ and radiation 22 is purely gain-guided. Profile 32B is an M-profile with the refractive index higher near the boundary between core 12 and cladding 14. In this case $\Delta n>0$ and it makes a positive contribution to the real part of complex-valued $V_c$-parameter. Thus, index-guiding supplements gain-guiding when using profile 32B. Profile 32C is a W-profile for which $\Delta n>0$ and it thus provides for positive index-guiding. Profile 32D is a parabolic profile where index $n_1$ of core 12 is lower than index $n_o$ of cladding 14. In this case $\Delta n<0$ and the contribution to the real part of complex-valued $V_c$-parameter is negative. Under these conditions, radiation 22 experiences index-antiguiding. Finally, in FIG. 8E profile 32E is parabolic and higher in core 12. Therefore, Δn>0. It should be noted that all index profiles discussed so far are rotationally symmetric. However, just as in the case of doping profiles, they do not have to be, i.e., the index profile can depend on radius r and angle ϕ, n=n (r,ϕ).

Figure 9:
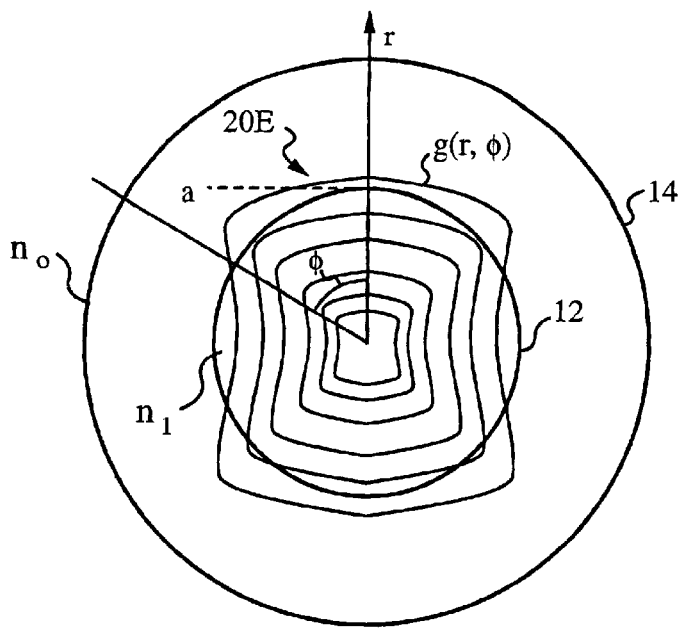
FIG. 9 is a cross-sectional plan view of a doping profile exhibiting radial and azimuthal variation.
Figure 10A:
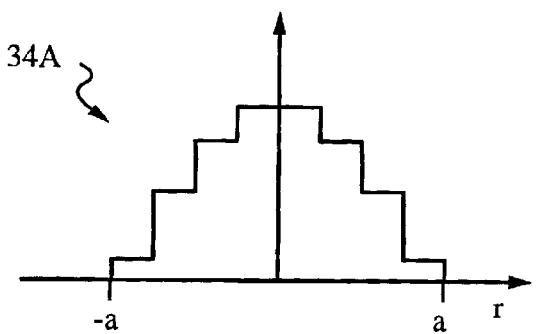
FIGS. 10A-B are graphs illustrating step-shaped profiles.
Figure 10B:
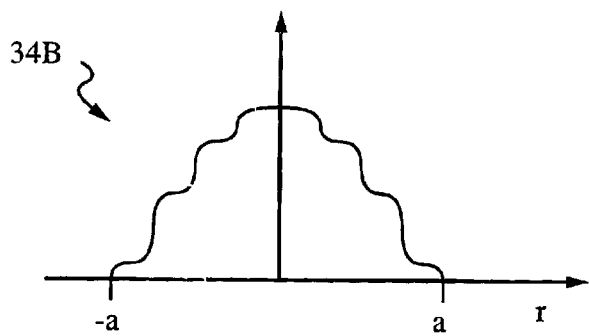

FIG. 9 illustrates a doping profile 20E within core 12 and a portion of cladding 14. Profile 20E depends on radius r and angle ϕ such that g=g (r,ϕ). Profile 20E is used if a preferential polarization of radiation 22 along the vertical direction (ϕ=0) is desired. FIGS. 10A–B illustrate additional step-profiles 34A–B which can be used in establishing the doping profile or index profile or both. In general, solutions to more complex-valued doping profiles and index profiles are mathematically more challenging to derive. For example, parabolic profiles will yield complex-valued Hermite-Gaussian modes as solutions and more complex-valued profiles will yield still other solutions. A person skilled in the art will be able to derive these solutions directly from Maxwell's equations given the boundary conditions imposed by the particular profile used.

Figure 11:
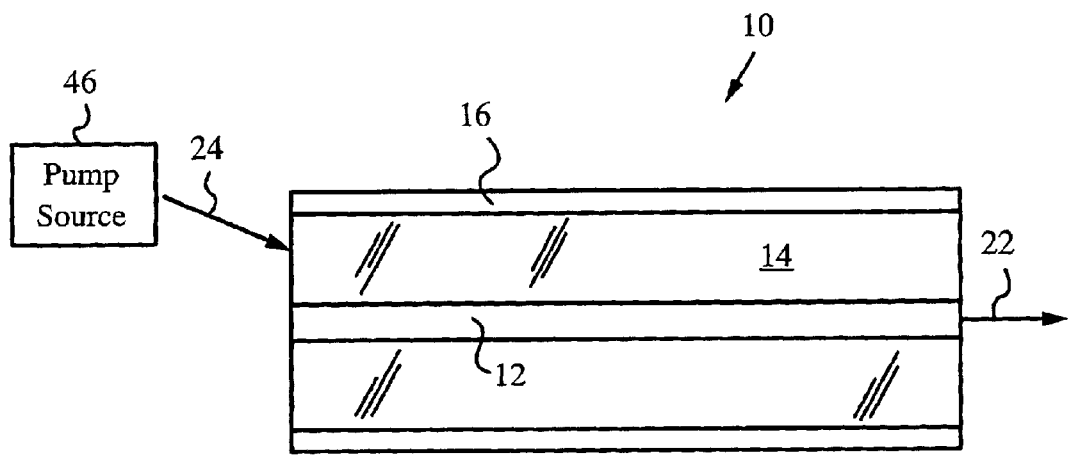
FIG. 11 is a diagram illustrating the use of the fiber of FIG. 1 in a fiber laser.

FIG. 11 shows optical fiber 10 used as a fiber laser. A pump source 46, or a multiplicity of such pump sources provides pump radiation 24 that is coupled into the core 12 and the cladding 14 portions of the fiber. Pump radiation may be injected in this fashion into one or both ends of the fiber. The outer cladding 16 has a lower index of refraction than the cladding region 14 in order to ensure that the pumping radiation 24 is trapped within the core 12 and cladding 14 regions of the fiber.

As is well understood in the prior art for cladding pumped fibers, the rate at which pump radiation 24 is gradually absorbed out of the cladding region 14 by the active laser atoms in the core 12 is determined by the relative diameters, or more precisely by the relative cross-sectional areas of the core region 12 and the cladding region 14. The rate of pump absorption can also be controlled to some extent by known techniques in which the outer perimeter of the cladding region 14 may be made scalloped or D-shaped rather than purely cylindrical in cross section. At the same time the cladding region 14 will always be of sufficiently large diameter that the outer cladding 16 will have negligible effects on the propagation of the laser radiation 22 that is guided within the core 12 of the fiber.

Figure 12A:
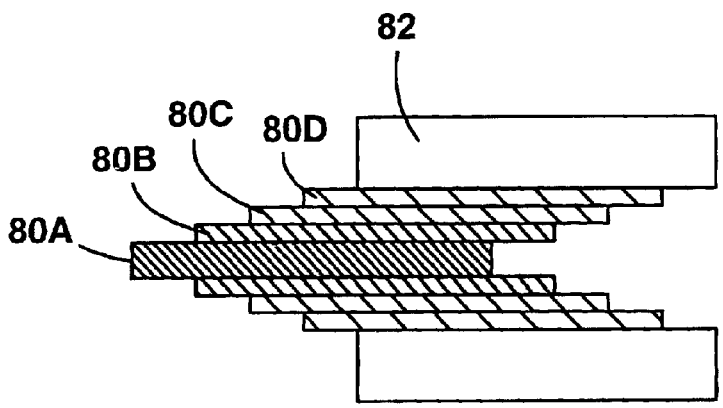
FIGS. 12A–B are cross-sectional plan views illustrating the manufacture of a fiber in accordance with the invention.
Figure 12B:
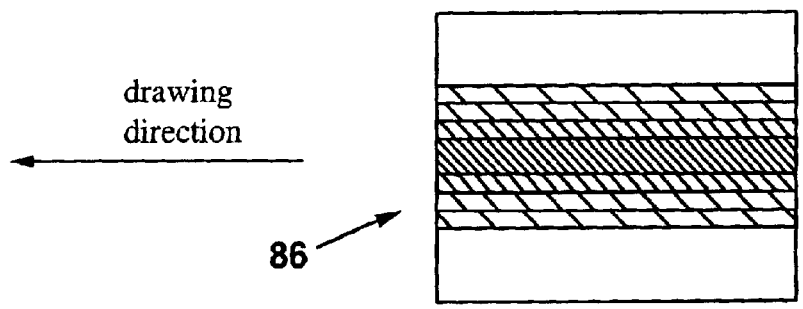

FIGS. 12A–B illustrate one technique by which one might construct an optical fiber 86 with the desired index and gain doping profiles. First a series of telescoping glass tubes or cylinders 80B, 80C, 80D together with an innermost glass rod 80A are prepared independently, with each of these component being fabricated from a separate glass melt having a glass composition and doping that yields the desired refractive index and doping density or concentration for each individual component. For example for making the embodiment with a bell-shaped or parabolic doping profile the central rod 80A is fabricated from a glass melt with the highest active laser atom doping level and the outermost tube 80D has the lowest laser atom doping level, with tubes 80B, 80C having intermediate doping levels.

At the same time, the compositions of the glass melts for each tube can be altered slightly by the addition of other known dopants to control the refractive indices of these glass in order to achieve the designed index profile along with laser atom doping profile. These doped tubes are then fitted within an outmost cylinder 82 made from a glass having no active laser atom doping and with a desired refractive index to form the cladding 14. This collection of concentric tubes then forms what is conventionally referred to as the fiber preform, from which the final fiber can be pulled.

The doping profile for the preform in this example will have the form of a stairstepped profile as shown in FIG. 10A. This perform is then heated to near the softening points of the glass and one end is pulled out so that the diameter of the assembly shrinks and is drawn into a thin fiber, as is well known in the art of making optical fibers. This process of heating and shrinking, depending on just how it is carried out, may also cause the solid state laser ions in the layers to diffuse radially, smoothing out the doping profile as shown in profile 34B of FIG. 10B. Additional annealing steps at elevated temperature can further smooth these stairsteps.

It will be apparent to those skilled in the fiber art that the above technique is an extension of the so-called "rod and tube" fiber manufacturing technique described in fiber references and used in the earlier days of the fiber era to construct conventional index-guided fibers. A particular advantage of this technique for the present invention is that the individual glass layers can be fabricated from separate "melts" prepared in separate glass furnaces. Each of these components can thus be fabricated using slightly different glass compositions and added dopants that can be separately controlled to provide precise control over the refractive index as well as laser doping concentration of each individual component.

Next, drawing form 86 is heated and drawn into thin glass fibers as is known in the art of making optical fibers. The heat from drawing causes the solid state laser ions in the glass to diffuse, smoothing the stairstepped doping profile. After drawing, the doping profile may still have a somewhat stairstepped shape, such as profile 34B shown in FIG. 10B. Additional annealing steps at elevated temperature can be used to further smooth these stairsteps.

The above guidelines provide a method for designing and fabricating gain-guided optical fibers with various gain doping and refractive index profiles ranging from simple step profiles to more complex-valued shapes such as bell-shaped or parabolic profiles. Below are provided some specific examples of fiber designs that have been mathematically calculated in accordance with the invention, together with their modal and gain performance characteristics. It will be noted that each of these examples employs a large diameter core, in the range of 100 microns or more. Yet each of these examples also provides either single-mode operation, or at most two propagating modes with large gain discrimination between the lowest-order and second-order mode.

EXAMPLE 1

Figure 13:
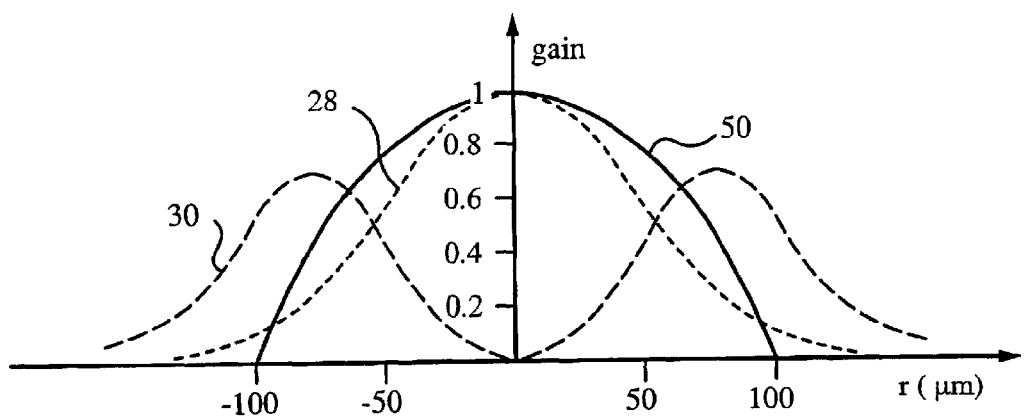
FIGS. 13–18 are graphs of doping profiles with superposed modes.

FIG. 13 is a graph showing a parabolic doping profile 50 with a doping diameter of 200 μm produced in a fiber core of 200 μm diameter. The fiber has a uniform refractive index (Δn=0). The gain has a maximum of 1 $cm^{-1}$ or 4.34 dB/cm on the fiber axis. Fundamental mode 28 (TEM00) and first-order mode 30 (TEM01) are superimposed on doping profile 50 for better visualization. The TEM00 mode gain in this example is 2.86 dB/cm.

EXAMPLE 2

Figure 14:
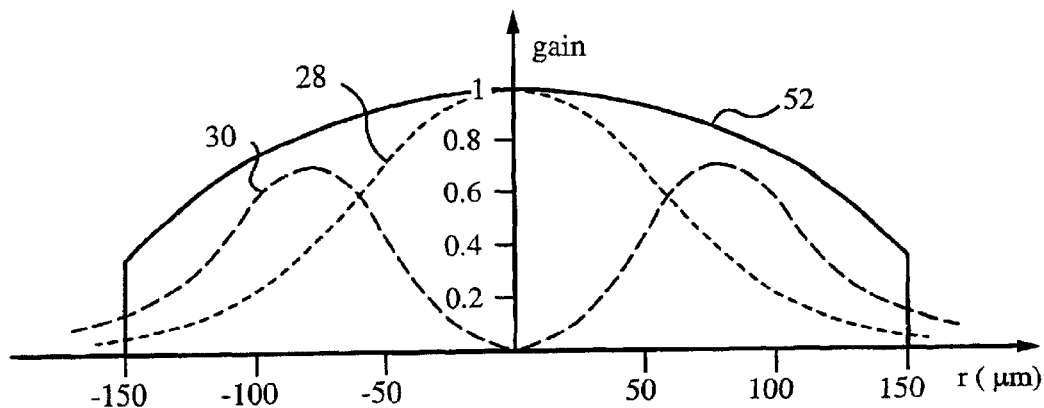

FIG. 14 shows a graph of a truncated parabolic doping profile 52 with a doping diameter of 300 μm produced in a fiber core of 300 μm diameter. The fiber has a uniform refractive index (Δn=0). The gain has a maximum of 1 $cm^{-1}$ or 4.34 dB/cm on the fiber axis. Fundamental mode 28 (TEM00) and first-order mode 30 (TEM01) are superimposed on doping profile 52. The TEM00 mode gain in this example is 2.64 dB/cm and TEM01 mode gain is 2.24 dB/cm.

EXAMPLE 3

Figure 15:
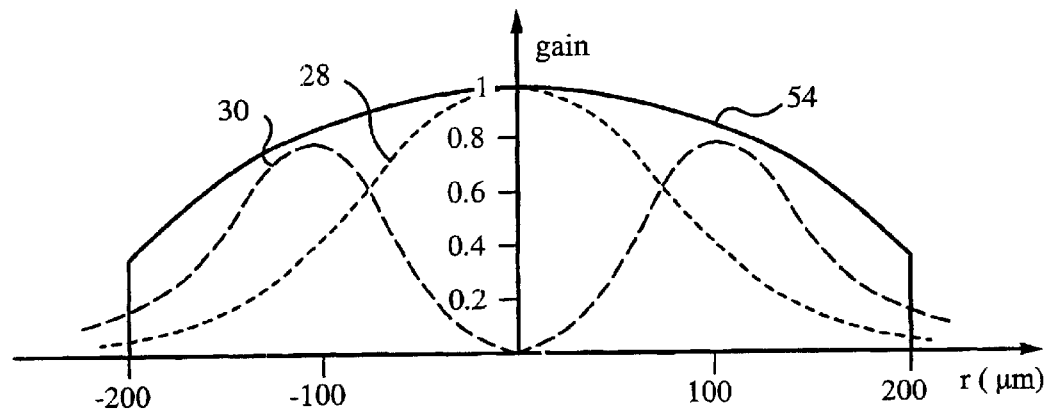

FIG. 15 shows a graph of a truncated parabolic doping profile 54 with a doping diameter of 400 μm produced in a fiber core of 400 μm diameter. The fiber has a uniform refractive index (Δn=0). The gain has a maximum of 0.5 cm$^{-1}$ or 2.2 dB/cm on the fiber axis. In this example the TEM00 mode gain is 1.8 dB/cm and TEM01 mode gain is 1.06 dB/cm.

EXAMPLE 4

Figure 16:
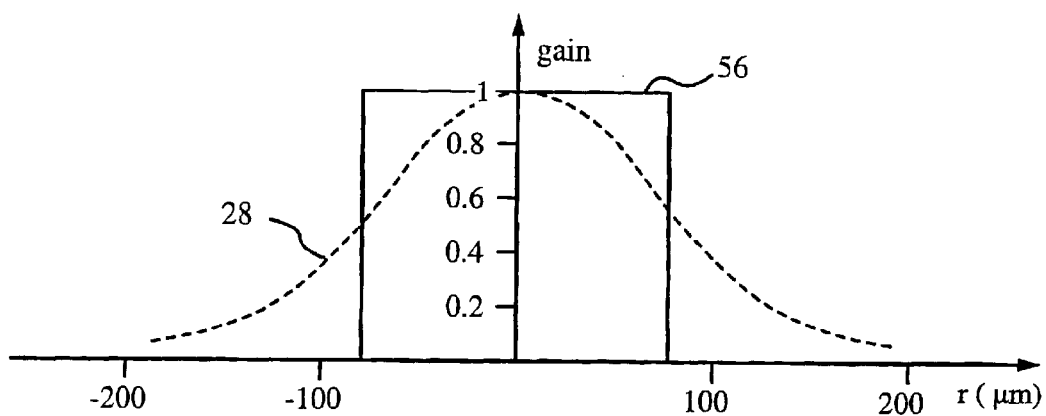

FIG. 16 shows a graph of a step doping profile 56 with a doping diameter of 150 μm produced in a fiber core of 150 μm diameter. The fiber has a uniform refractive index (Δn=0) The gain has a maximum of 1 cm$^{-1}$ on the fiber axis. In this example the TEM00 mode gain is 0.65 dB/cm and the percent power retained in the core is 65%.

Figure 17:
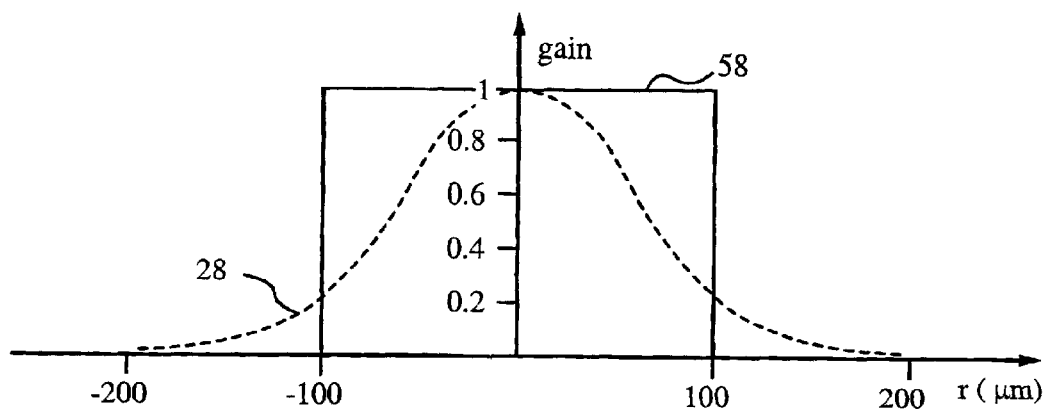
Figure 18:
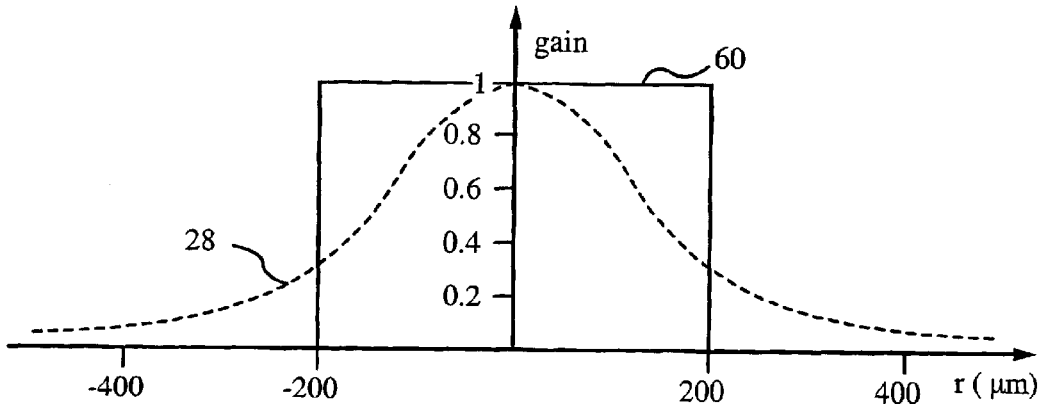

Note that this and the following two examples represent purely gain-guided fibers that are entirely single-mode in operation, despite the large diameter of the doped core of the fiber. As shown in FIGS. 16 through 18, in each case the single mode of the fiber has a large fraction of its energy contained within the doped core, as is desirable for efficient laser operation, although the "tails" of these modes in each case have some spillover out into the cladding region of the laser.

EXAMPLE 5

FIG. 17 shows a graph of a step doping profile 58 with a doping diameter of 200 μm in a core of 200 μm diameter. The fiber has a uniform refractive index (Δn=0). The gain has a maximum of 1 cm$^{-1}$ on the fiber axis, the TEM00 mode gain is 0.82 dB/cm and the percent power retained in the core is 82.4%.

EXAMPLE 6

FIG. 18 shows a graph of a step doping profile 60 with a doping diameter of 400 μm and a core diameter of 400 μm. The fiber has a uniform refractive index (Δn=0). The gain has a maximum of 0.1 cm$^{-1}$ on the fiber axis, the TEM00 mode gain is 0.48 dB/cm and the percent power retained in the core is 48%.

It will be clear to one skilled in the art that the above embodiments may be altered in many ways without departing from the scope of the invention. Accordingly, the scope of the invention should be determined by the following claims and their legal equivalents.

What is claimed is:

1. An optical fiber having a complex-valued $V_c$-parameter, said optical fiber comprising:
   a) a core;
   b) a cladding surrounding said core;
   c) an active dopant distributed in a doping profile within said optical fiber; wherein said doping profile establishes a gain g having a sufficiently large contribution to an imaginary part of said complex-valued $V_c$-parameter to define at least one gain-guided mode of a radiation in said optical fiber.

2. The optical fiber of claim 1, wherein said core and said cladding exhibit an index profile contributing to a real part of the square of said complex-valued $V_c$-parameter.

3. The optical fiber of claim 2, wherein said index profile is selected such that said real part is positive, thereby providing for index-guiding of said radiation.

4. The optical fiber of claim 3, wherein said index profile is selected from the group of M-profiles, W-profiles, graded profiles and step-profiles.

5. The optical fiber of claim 2, wherein said index profile is selected such that said real part is negative thereby providing for index-antiguiding of said radiation.

6. The optical fiber of claim 5, wherein said index profile is selected from the group of M-profiles, W-profiles, graded profiles and step-profiles.

7. The optical fiber of claim 1, wherein said optical fiber is a single-mode fiber.

8. The optical fiber of claim 1, wherein said optical fiber is a multi-mode fiber.

9. The optical fiber of claim 1, wherein said core has a diameter in the range of 50–500 microns.

10. The optical fiber of claim 1, wherein said optical fiber has a fiber axis and said doping profile has a maximum on said fiber axis.

11. The optical fiber of claim 10, wherein said optical fiber has a radius defined from said fiber axis and said doping profile decreases monotonically with increasing radius.

12. The optical fiber of claim 10, wherein said doping profile is a parabolic doping profile centered on said fiber axis.

13. The optical fiber of claim 10, wherein said doping profile has a step-profile comprising at least one step.

14. The optical fiber of claim 1, wherein said active dopant comprises active ions selected from the group consisting of Nd, Yb, and Er.

15. The optical fiber of claim 1, further comprising a pump source coupled to said cladding for providing a pump radiation.

16. A method for designing an optical fiber having a complex-valued $V_c$-parameter comprising:
   a) defining a core;
   b) surrounding said core by a cladding;
   c) doping said optical fiber with an active dopant to produce a doping profile, said doping profile establishing a gain g having a sufficiently large contribution to an imaginary part of said complex-valued $V_c$-parameter to define at least one gain-guided mode of a radiation in said optical fiber.

17. The method of claim 16, further comprising defining an index profile in said fiber, said index profile contributing to a real part of the square of said complex-valued $V_c$-parameter.

18. The method of claim 17, wherein said index profile is defined such that said real part is positive, thereby providing for index-guiding of said radiation.

19. The method of claim 17, wherein said index profile is defined such that said real part is negative, thereby providing for index-antiguiding of said radiation.

20. The method of claim 17, wherein said optical fiber has a step index profile and a step dopant profile, and said complex-valued $V_c$-parameter is approximated as:

$$V_c \approx \left(\frac{2\pi a}{\lambda}\right)\sqrt{2n_1\left[\Delta n + j\frac{\lambda}{2\pi}g\right]},$$

where a is the radius of said core, $n_1$ is index of refraction of said core, Δn is the index difference between said core and said cladding and λ is the free space wavelength of said radiation.

* * * * *